United States Patent
Sundgren et al.

(10) Patent No.: US 6,684,505 B2
(45) Date of Patent: Feb. 3, 2004

(54) METHOD FOR MANUFACTURING A BUMPER BAR

(75) Inventors: Anders Sundgren, Sunderbyn (SE); Mats Lindberg, Luleå (SE); Göran Berglund, Gammelstad (SE)

(73) Assignee: Accra Teknik AB, Öjebyn (SE)

( * ) Notice: Subject to any disclaimer, the term of this patent is extended or adjusted under 35 U.S.C. 154(b) by 93 days.

(21) Appl. No.: 09/924,429

(22) Filed: Aug. 8, 2001

(65) Prior Publication Data

US 2001/0054827 A1 Dec. 27, 2001

Related U.S. Application Data

(62) Division of application No. 09/567,846, filed on May 9, 2000, now Pat. No. 6,352,297.

(30) Foreign Application Priority Data

Dec. 14, 1999 (SE) .............................................. 9904566

(51) Int. Cl.$^7$ .............................................. B21D 53/88
(52) U.S. Cl. .............................. 29/897.2; 29/897.312; 29/897.35; 29/890.053; 29/33 D; 29/33 T
(58) Field of Search ................................. 29/897, 897.2, 29/897.3, 897.312, 897.35, 897.33, 505, 890.053, 890.054, 33 D, 33 T; 52/735.1, 731.2, 731.6, 745.19, 737.6; 293/120, 102, 122, 126, 132; 296/205, 188; 228/146; 72/370.1, 370.23, 370.26

(56) References Cited

U.S. PATENT DOCUMENTS

| | | | |
|---|---|---|---|
| 3,698,224 A | 10/1972 | Saytes | |
| 3,851,909 A | * 12/1974 | Kalitta | 293/120 |
| 4,597,601 A | 7/1986 | Manning | |
| 4,652,032 A | 3/1987 | Smith | |
| 5,104,026 A | * 4/1992 | Sturrus et al. | 228/17.5 |
| 5,340,178 A | 8/1994 | Stewart et al. | |
| 5,395,036 A | * 3/1995 | Sturrus | 228/146 |
| 5,425,561 A | 6/1995 | Morgan | |
| 5,462,325 A | 10/1995 | Masuda et al. | |
| 5,498,045 A | 3/1996 | Morgan et al. | |
| 5,577,796 A | * 11/1996 | Clausen | 296/202 |
| 5,603,541 A | 2/1997 | Wada et al. | |
| 5,803,517 A | 9/1998 | Shibuya | |
| 5,829,666 A | * 11/1998 | Takeda et al. | 228/147 |
| 5,997,057 A | 12/1999 | Gasko et al. | |
| 5,997,058 A | 12/1999 | Pedersen | |
| 6,000,738 A | 12/1999 | Stewart et al. | |
| 6,042,163 A | 3/2000 | Reiffer | |
| 6,082,792 A | 7/2000 | Evans et al. | |
| 6,141,935 A | * 11/2000 | Artner et al. | 52/735.1 |
| 6,349,521 B1 | * 2/2002 | McKeon et al. | 52/735.1 |
| 6,357,816 B1 | * 3/2002 | Porter | 296/102 |
| 6,360,441 B1 | * 3/2002 | Himsl et al. | 29/897.2 |
| 6,477,774 B1 | * 11/2002 | Marando et al. | 29/897.2 |
| 6,485,072 B1 | * 11/2002 | Werner et al. | 293/132 |
| 6,510,771 B2 | * 1/2003 | Sturrus et al. | 83/54 |

FOREIGN PATENT DOCUMENTS

| | | |
|---|---|---|
| EP | 0426565 | 5/1991 |
| EP | 0449599 | 10/1991 |
| JP | 406247237 | 9/1994 |

* cited by examiner

*Primary Examiner*—Charles T. Jordan
*Assistant Examiner*—T. Nguyen
(74) *Attorney, Agent, or Firm*—Ware, Fressola, Van der Sluys & Adolphson LLP

(57) ABSTRACT

In a bumper bar for vehicles, the bar is extended in one dimension, has a closed cross-section and two ends and includes at least one front flange, one rear flange, one top side and one bottom side. The bumper bar has at least one part of the rear flange, lying along the bar, in contact with at least one part of the front flange, also lying along the bar. In the method for manufacturing the bumper bar, the at least one part of the rear flange is wholly or partially pressed in towards the at least one part of the front flange.

23 Claims, 3 Drawing Sheets

METHOD FOR MANUFACTURING A BUMPER BAR

CROSS REFERENCE TO RELATED APPLICATIONS

This application is a divisional of U.S. Ser. No. 09/567,846 filed May 9, 2000 now U.S. Pat. No. 6,352,297.

BACKGROUND OF THE INVENTION

1. Technical Field

This invention relates to a bumper bar for vehicles and a method for manufacturing the same.

2. Description of the Background Art.

There are many demands on, and desires for, a completed vehicle. These include that the vehicle should protect passengers and load in a collision. This is achieved in that various components in and on the vehicle are designed and constructed to absorb energy, to distribute energy and to conduct energy during a collision.

If the transfer of energy from a collision object to the vehicle is limited, for example if the vehicle drives into a collision object at low speed, the parts should mainly absorb and distribute the forces so that as small a change of shape as possible takes place in the vehicle and its components. It is preferable that the change of shape is temporary, so-called "elastic deformation".

If the transfer of energy from the collision object to the vehicle is large, for example if the vehicle drives into a collision object at high speed, the components that absorb energy should absorb and distribute the forces in such a manner that the energy is used in a controlled way as far as is possible, for example, by using the energy to destroy certain components of the vehicle that have been specified in advance and constructed for this purpose, and that can be easily replaced after the collision. This is usually called "plastic deformation".

A number of different construction components are usually required to handle the energy and to provide all of the functions that are required during different collisions. The components and the zones that absorb energy thus often become large, clumsy and expensive with respect to the constituent material, handling during manufacture and in the completed vehicle.

Furthermore, the vehicle must have a design that provides the required driving properties, external and internal dimensions and spaces. The vehicle must also have an appearance that corresponds to the wishes and expectations of the customers. There are often conflicts between traffic safety and the design of a vehicle. Vehicles that are small, fast and often minimalist in form attract more purchasers than larger vehicles with several and well dimensioned safety zones do.

There are also a number of demands and wishes that must be satisfied during manufacture of the vehicle. These can be associated with environmental, manufacturing technical and, not least, economic aspects before, during and after the actual manufacture.

The increased demands for traffic safety have resulted in an altered basic construction of bumper bars. It is nowadays normal for the bar to have a closed cross-section. This design of the bar results in the bumper absorbing collision forces and torsional loadings, and distributing extensions in an optimal manner. The closed cross-section, however, makes the bar large and means that it requires a lot of space, and it is often difficult to mount in the space available in a vehicle body.

EP 0 449 599, A1, shows a roll-formed bumper and a method for making the same. The bumper has a closed cross-section. The bumper has been pressed and deformed at the ends to a construction that is essentially flat, in order to facilitate the mounting of the bar. The deformation results in a reduction in the outer dimensions of the bumper in one direction, and an increase in another direction, see FIGS. 13–15. This is, naturally, a disadvantage if the space available is limited in more than one direction. The deformation gives rise to tensions in the material that are difficult to control, not least during a collision.

U.S. Pat. No. 5,603,541 shows a bumper bar with an open cross-section, which is constructed such that its shape can be changed. The ends of the bar are provided with parts that can be bent inwards. When these parts are bent or folded into the bar construction, in the direction of the front of the vehicle, the ends of the bar can be shaped and given the desired appearance. Many operations and manufacturing stations are required to obtain a bar that is ready to mount, and this is expensive. The collision properties of the bar are also affected since it is a question of the removal of material and various processing operations of the material itself, which give rise to tensions and alterations of the material.

Known constructions of bumper bars do not offer any complete solutions to the demands and desires that exist. It is an intention of the present invention to offer a bar that makes it possible to manufacture vehicles that are safe in traffic within the strict technical and economic tolerances that exist in the vehicle industry. The invention also makes it possible to make the manufacture of vehicles that are safe in traffic more cost-effective.

An embodiment of the invention will here be described with reference to the figures. Further advantages and features of the invention will be described.

DETAILED DESCRIPTION OF THE INVENTION

Figure 1:
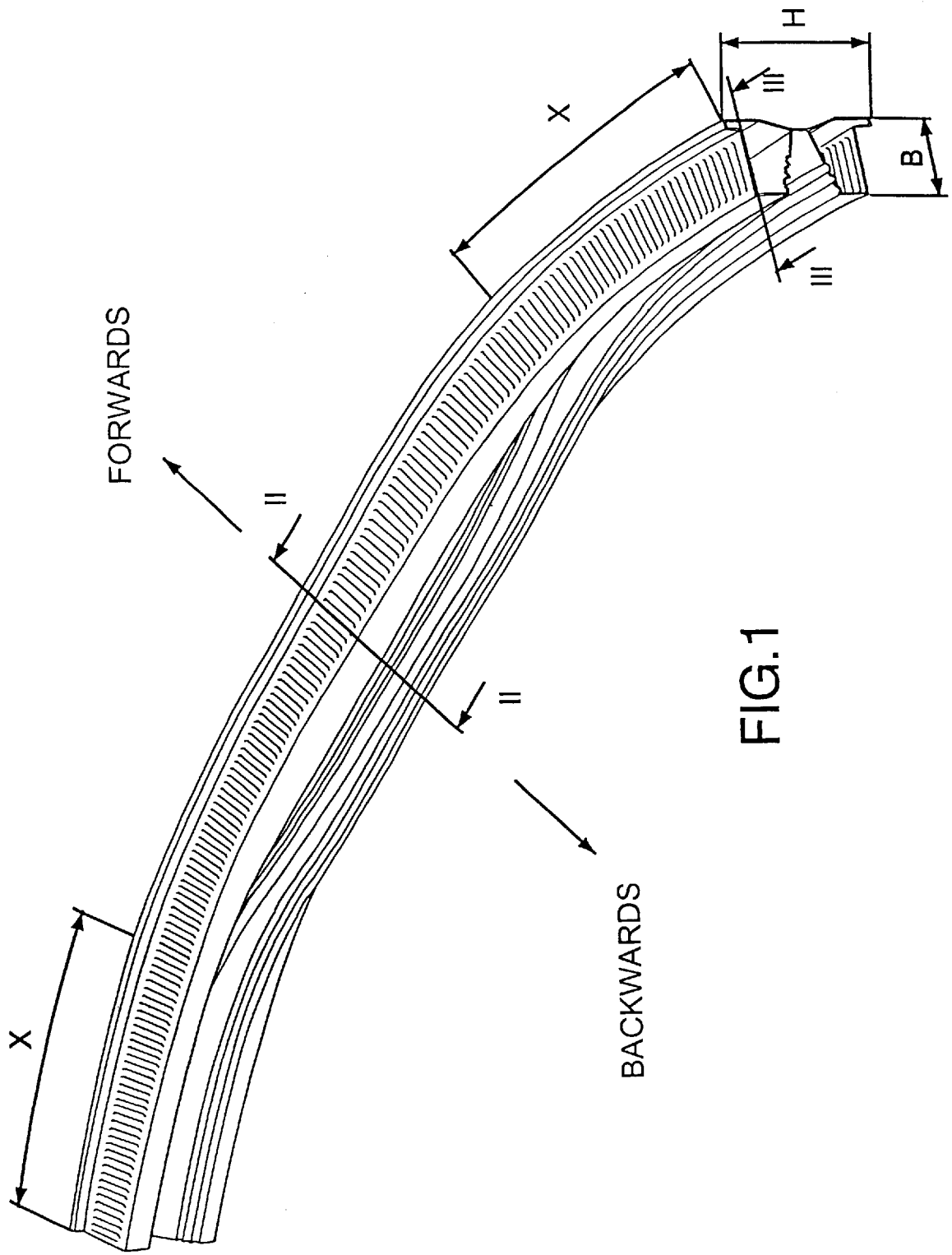
FIG. 1 shows a view in perspective of a bumper bar according to the invention.

The bumper bar that is shown in FIG. 1 is to be mounted horizontally at the front end of a vehicle, at the front ends of the side bars of the vehicle. The mounting of the bumper at the side bars takes place with a freely chosen method. When the bumper bar has been mounted onto the vehicle, its main task is to meet, distribute and dissipate the energy that is absorbed during a collision between the vehicle and another object. The bar should mainly take care of those forces that act on the vehicle during a collision directly from the front or obliquely from the front. In the following description, the front end of the vehicle will provide a direction indicator. The word "forwards" will denote the direction in which the vehicle normally travels, and "backwards" will denote the opposite direction.

The bar is formed from sheet metal, for example, steel. Boron steel gives a good result and is economically advantageous. The bar is extended in one dimension and shaped as a tube with a closed cross-section (see FIG. 1). The bar includes a front flange 1, a rear flange 2, a top side 3 and a bottom side 4 (see FIG. 2). The flanges 1,2 and the top and bottom sides 3,4 comprise sections of one and the same piece of material and form the main limiting surfaces of the bar. The front flange 1 points forwards in the direction of the vehicle when the bar is mounted, and it comprises the first contact area between the bar and the collision object. The rear flange 2 makes it possible to fasten the bar at the front ends of the side bars of a vehicle. The flanges 1 and 2 and the top and bottom sides 3 and 4 are furnished with bends 5, grooves 6 and 7, or other similar shapings of the material, longitudinal and/or transverse relative to the long axis of the bar, affecting the energy-absorbing properties of the bar.

Figure 2:
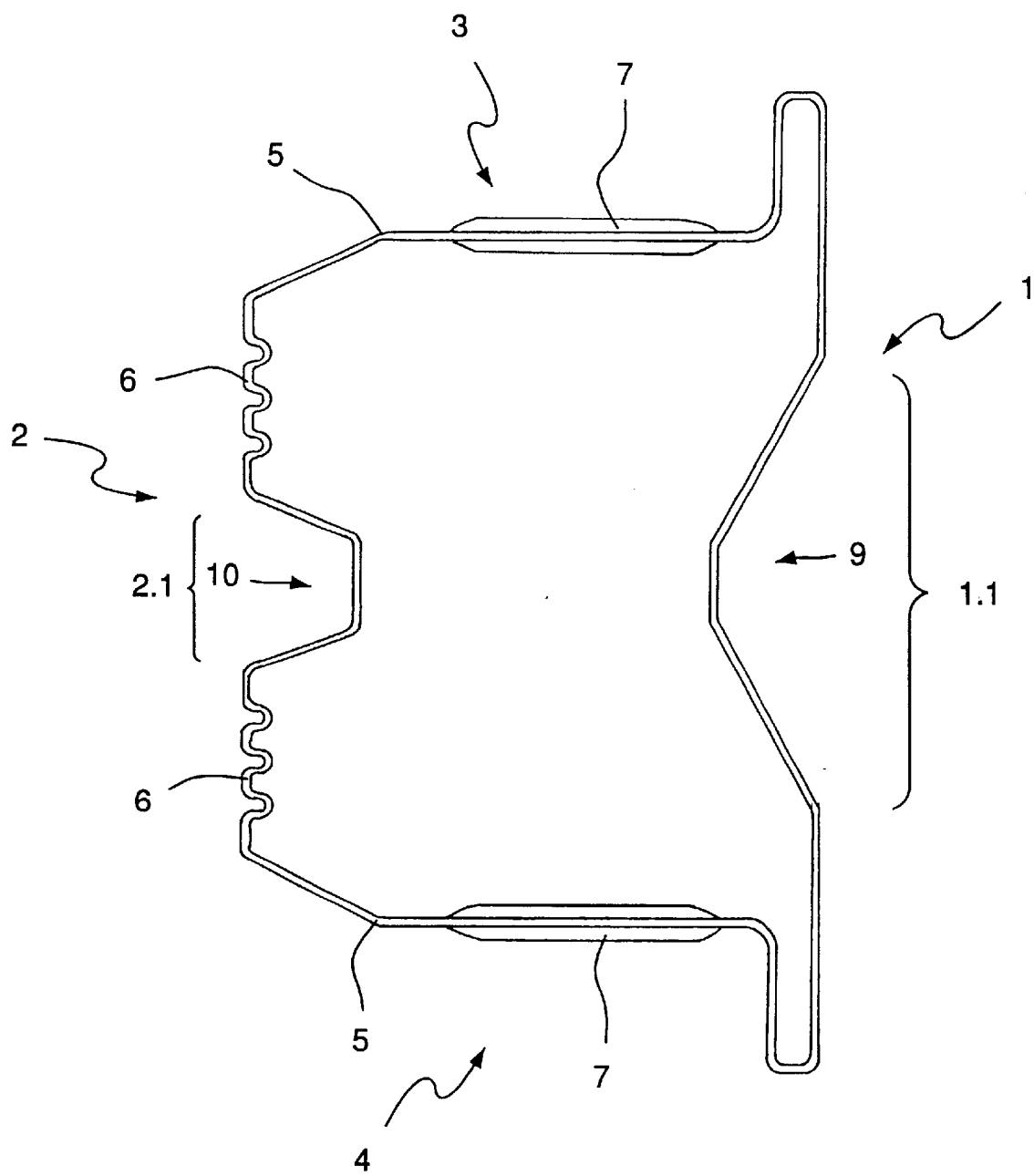
FIG. 2 shows a cross-section through the bar along the line II—II shown in FIG. 1

The bar has an undivided open inner area at its central part, and it is here that it has its maximum volume, distributed around the main axis of the bar (see FIGS. 1 and 2). The central part of the bar has a large volume and a large amount of material in order to offer the best possible energy absorption during a collision.

Figure 3:
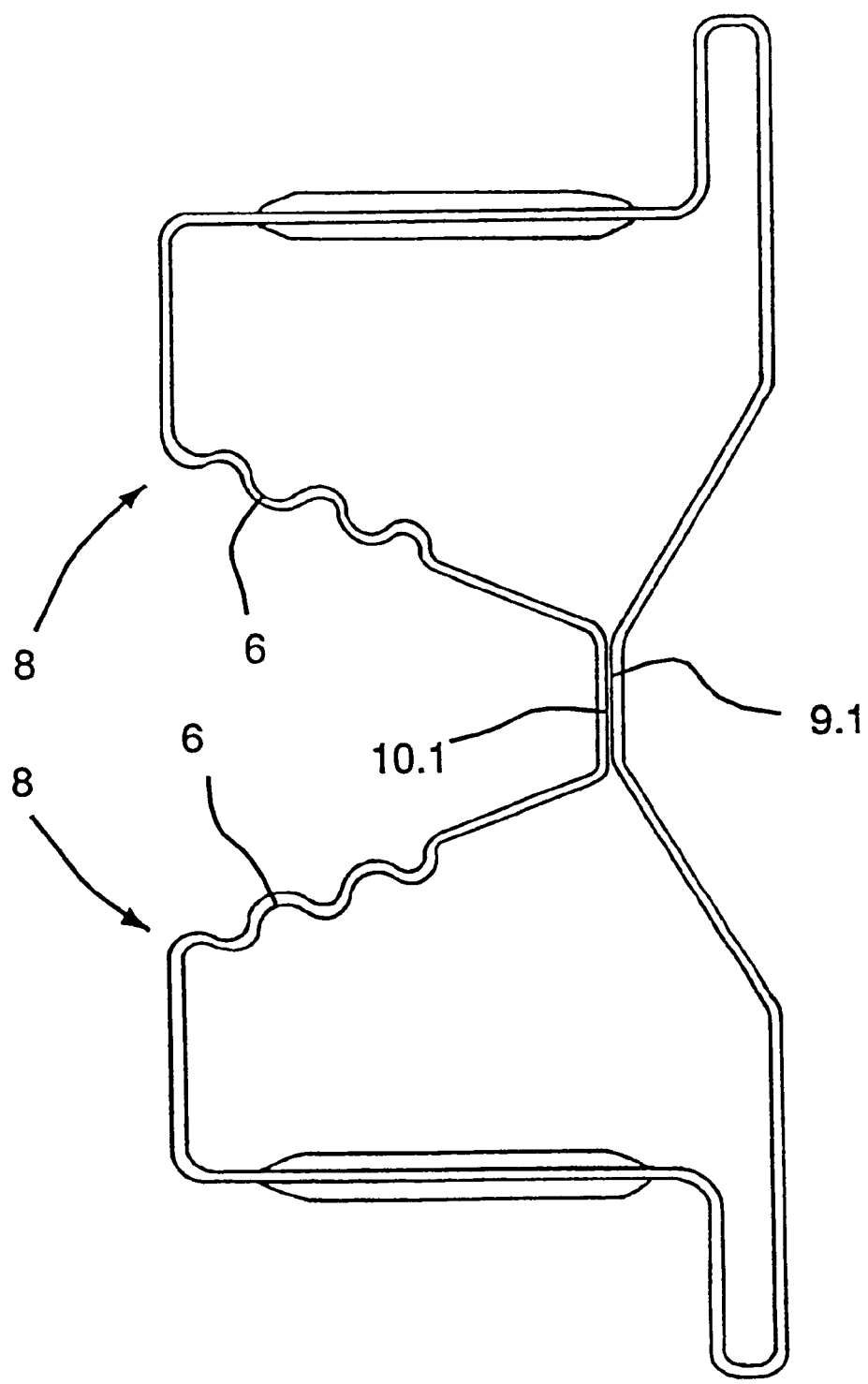
FIG. 3 shows the cross-section of one of the bar ends, along the line III—III shown in FIG. 1.

As can be seen in FIGS. 1 and 3, the shape of the bar changes at the ends in order to make the mounting bar onto the vehicle easier. The change of shape has taken place in a controlled manner, for example, in a forming tool. A longitudinal part 2.1 of the rear flange 2 is pressed in towards a longitudinal part 1.1 of the front flange 1. The longitudinal parts 1.1 and 2.1 constitute each a longitudinal central part of the two flanges 1 and 2, respectively. It is also possible to carry out the change of shape based on two or more longitudinal parts on each flange. Most of the rear flange 2, including a boundary region between the top side 3 and the bottom side 4 and the rear flange 2, are pressed into the bar. Through this pressing together, the bar obtains two tube-formed parts 8 with an open inner part along a length X at both of its ends (see FIGS. 1 and 3). The bar in the boundary region between the top side 3 and the bottom side 4 and the rear flange 2 is furnished with longitudinal bends 5 providing guides for and facilitating the pressing. The rear flange 2 has longitudinal grooves 6 that act as pliable bellows during the pressing. The sheet material in the grooves 6 is drawn out during the pressing and contributes to reducing the occurrence of inner tensions in the material. In this way, the formation of cracks and weaknesses can be reduced.

The rear flange 2 is depressed to such an extent that the inner surface of the longitudinal part 2.1 is brought into contact with the inner surface of the longitudinal part 1.1 of the front flange 1 (see FIG. 3). The two flanges 1 and 2 are welded together along the stretch X. The front flange 1 has not had its shape altered by the pressing together, but has the same appearance along the full length of the bar. The front flange 1 is furnished in its longitudinal central part 1.1 with a longitudinal trench-shaped indentation 9. The rear flange 2 also has a longitudinal trench-shaped indentation 10 in its longitudinal central part 2.1. The two indentations 9 and 10 are directed inwards into the central cavity of the bar, and both have a bottom part 9.1 and 10.1, respectively. The bottom part 9.1 of the indentation 9 in the front flange 1 is, at the ends of the bar, in contact with the bottom part 10.1 of the indentation 10 in the rear flange 3. The welded joint is in principle as long as the stretch X, and the bar shows the two tube formations 8 along the stretch X. This pressing together and welding implies that the bar has different energy-absorbing properties in this region than it has in its central part. The region of the welded joint constitutes a clear rotational guide for the bar during a collision. The bar will be more easily broken in this distinct region and in this way absorb large amounts of energy.

The bar has its maximum volume at its central part and its minimum volume at the ends, to be more precise, in the region where the flanges are united by the welded joint. The volume of the bar increases from the point where the welded joints terminate to its maximum volume at the center of the bar.

The bar is slightly curved (see FIG. 1). The ends of the bar point partially or wholly backwards and in this way the bar more easily follows the rounded frontal shape of the front of a vehicle. The top side and the bottom side have transverse grooves 7 in order to facilitate the bending of the bar. The grooves 7 act as bellows and are drawn out during the bending of the bar. The grooves 7 can also function as bending guides. The surplus sheet metal material in the grooves 7 is drawn out during the bending and this contributes to reducing the occurrence of inner tensions in the material. The formation of cracks and weaknesses can be minimized. The pressing together of the rear flange 2 against the front flange 1 facilitates the bending of the ends of the bar since the width B of the bar is reduced and the bar thus acquires a reduced resistance to bending.

The bar has a constant height H and a varying width B along its complete length (see FIG. 1). The bar has its maximal width at the central part and its minimum width at the ends. It is, of course, possible to form the bar with its construction of bends and grooves in a similar way along its complete length. The external dimensions of the bar after the pressing are always equal to or less than they were in the initial state of the bar. The bar becomes neither longer, wider or higher at any part of its extent. Nor is the bar exposed to any reduction of material that would lead to weakening.

The bumper bar satisfies the demands for durability that are posed on a bar of this type and the demands that exist concerning appearance, adaptability and, not least, cost-efficiency. The bumper bar makes it possible to manufacture vehicles that are safe in traffic within the strict technical and economic demands that exist in the vehicle industry.

The method for manufacturing the bumper bar is commenced by feeding a flat sheet into a roll-forming device. The sheet is shaped into a tubular extended element with a closed cross-section in the roll-forming device. The closed cross-section is obtained by welding together by spot welding, seam welding, or a similar method, the edges of the plate, which after the roll-forming meet and make contact with each other. The roll-forming device can shape bends 5, longitudinal grooves 6 and transverse grooves 7 in the sheet in order to make the further shaping of the bar possible, and also to improve the final torsional rigidity, flexural rigidity and other properties of the bar that take up forces during a collision. Before the roll-forming is commenced, the sheet can be cut into suitable lengths, which ensures that the final length of the bumper bar is as desired. The sheet can also be cut after the roll-forming operation.

After this, the bar is placed in an oven and heated to a suitable austenitizing temperature for the material. A suitable temperature for boron steel lies around 900° C. Once the bar has reached the correct temperature, it is placed in a combined forming—and quenching tool.

The longitudinal central part 2.1 of the rear flange 2 is pushed in towards the longitudinal central part 1.1 of the front flange 1 in the forming tool, whereby the width B, the so-called building height, of the bumper bar is reduced. This inwards pressing mainly takes place at the ends of the bumper bar, from that region of the bar that is to be fixed to the side bars of the vehicle and outwards, approximately along the stretch X shown in FIG. 1. During the roll-forming, the bar has received bends 5 that act as guides to facilitate the pressing together. The rear flange 2 is also furnished with longitudinal grooves 6 which are drawn out as a bellow during this pressing in of the rear flange, and facilitate the shaping. The risk for extension of the material and the tension that arises from it is minimized. It is an advantage if the pressing together is complete in a centered part of the cross-section of the bar at the very end of the furthest part of the bar, so that the two flanges 1 and 2 come into contact with each other. It is an advantage if the flanges 1 and 2 of the bumper bar are welded together where the inner surfaces of the flanges meet each other after the pressing together, along the stretch X. The welded joint will constitute a clear rotation—and breakage guide during a collision, to take care of the collision forces.

In addition to the pressing together, the bumper bar is shaped along its horizontal extension by bending. The bar is completely straight when it comes out from the roll-forming device. The front of a vehicle is often bent backwards out towards the sides of the vehicle in order to reduce air resistance, to improve the properties of the vehicle for absorbing collision forces and to make the appearance attractive. The bumper bar should have an equivalent bending in order to optimize the use of available space. The ends of the bar are bent backwards with the same forming tool that carries out the pressing together. During the roll-forming, the bar has been furnished with transverse grooves 7 on the top side 3 and the bottom side 4, which facilitate this bending. The grooves 7 are drawn out as a bellow and the risk for extension of the material and tension that arises from it is thus minimized. The pressing together of the rear flange 2 against the front flange 1 facilitates the bending of the bar since the width B of the bar and thus its flexural rigidity have been reduced at the end parts of the bar.

After the shaping, the bumper bar is quenched, still located in the forming tool. This method gives a bumper bar that is constructed in one piece and that only requires one roll-forming device and only one further forming device, which shapes the details and at the same time provides the bar with stability during quenching. The manufacture of vehicles that are safe in traffic becomes cost-efficient and of high quality.

It is fully possible within the scope of the invention to have other solutions and detailed designs of certain parts of the bar. The number, appearance and construction of grooves and bends can be varied and complemented in order to control and vary the collision properties of the bar. This description is not to be seen as a limitation of the invention; it should rather be seen as a guide to full understanding of the invention in all of its parts.

What is claimed is:

1. Method for manufacturing a bumper bar for a vehicle, comprising the steps of:
   (a) providing metal material to make the bar;
   (b) forming the metal material into a tubular extended element with a front flange for facing forwards in the same direction of motion of the vehicle and a rear flange with grooves therein, a top side and a bottom side, the tubular extended element having a closed cross-section and at least one bend between the rear flange and top side and at least one bend between the rear flange and the bottom side; and
   (c) shaping the tubular extended element by pressing at least one part of the rear flange against at least one part of the front flange with the bends acting as guides facilitating the pressing and the grooves in the rear flange being drawn out during the pressing and facilitating the shaping.

2. Method according to claim 1, wherein, following the forming step, inner surfaces of the at least one parts of the rear and front flanges are in contact over a definite and limited stretch from the ends of the tubular extended element towards a center of the tubular extended element.

3. Method according to claim 2, further including the step of joining the front and rear flanges to each other along the stretch from the ends of the tubular extended element and in towards the center of the tubular extended element along the at least one parts of the rear and front flanges.

4. Method according to claim 3, wherein the bends are in a region around the at least one part of the rear flange, the bends lie along the tubular extended element and constitute guides to facilitate pressing in of the at least one part of the rear flange toward the at least one part of the front flange.

5. Method according to claim 4, wherein the grooves in the rear flange are in the region around the at least one part of the rear flange, the grooves lie along the tubular extended element and act like a bellows during pressing in of the at least one part of the rear flange toward the at least one part of the front flange.

6. Method according to claim 5, further including the step of bending the tubular extended element.

7. Method according to claim 6, wherein the top side and the bottom side have grooves running transverse to the tubular extended element and acting like a bellows during the bending step.

8. Method according to claim 2, further including the step of bending the tubular extended element.

9. Method according to claim 8, wherein the top side and the bottom side have grooves running transverse to the tubular extended element and acting like a bellows during the bending step.

10. Method according to claim 1, wherein the bends are in a region around the at least one part of the rear flange, the bends lie along the tubular extended element and constitute guides to facilitate pressing in of the at least one part of the rear flange toward the at least one part of the front flange.

11. Method according to claim 10, wherein the grooves in the rear flange are in the region around the at least one part of the rear flange, the grooves lie along the tubular extended element and act like a bellows during pressing in of the at least one part of the rear flange toward the at least one part of the front flange.

12. Method according to claim 11, further including the step of bending the tubular extended element.

13. Method according to claim 12, wherein the top side and the bottom side have grooves running transverse to the tubular extended element and acting like a bellows during the bending step.

14. Method according to claim 1, wherein the grooves in the rear flange are in the region around the at least one part of the rear flange, the grooves lie along the tubular extended element and act like a bellows during pressing in of the at least one part of the rear flange toward the at least one part of the front flange.

15. Method according to claim 14, further including the step of bending the tubular extended element.

16. Method according to claim 15, wherein the top side and the bottom side have grooves running transverse to the tubular extended element and acting like a bellows during the bending step.

17. Method according to claim 1, further including the step of heating the material to a chosen austenitizing temperature based on the material between the forming and shaping steps.

18. Method according to claim 17, further including the step of quenching the bar after the shaping step.

19. Method according to claim 1, further including the step of quenching the bar after the shaping step.

20. Method for manufacturing a bumper bar for a vehicle, comprising the steps of:

(a) providing material to make the bar;

(b) forming from the material a front flange of the bar for facing forward in the same direction of motion of the vehicle, a rear flange of the bar in a nonadjacent relationship, to the front flange, a top side of the bar extending between the front and rear flanges and a bottom side of the bar extending between the front and rear flanges;

(c) heating the material to a chosen austenitizing temperature based on the material of the bar; and (d) shaping the material in a forming tool in which at least one part of the rear flange, lying along the bar, is pressed in against at least one part of the front flange, also lying along the bar.

21. Method according to claim 20, further including the step of bending of the bar which is initiated and facilitated by pressing in of the rear flange against the at least one part of the front flange so that shaping of the bar is determined by the forming tool.

22. Method according to claim 21, further including the step of quenching the bar after the shaping in the forming tool.

23. Method according to claim 20, further including the step of quenching the bar after the shaping in the forming tool.

* * * * *